United States Patent [19]

Baer

[11] Patent Number: 5,088,079
[45] Date of Patent: Feb. 11, 1992

[54] CARRIAGE OPTICS SYSTEM FOR OPTICAL DATA STORAGE SYSTEM

[75] Inventor: James W. Baer, Boulder, Colo.

[73] Assignee: Stuff Technology Partners-II, Denver, Colo.

[21] Appl. No.: 404,941

[22] Filed: Sep. 8, 1989

[51] Int. Cl.⁵ .............................. G11B 7/095
[52] U.S. Cl. ........................ 369/44.26; 369/112; 369/44.23; 369/44.38
[58] Field of Search ............... 369/44.11, 44.22, 32, 369/111, 112, 44.38, 44.26, 44.28, 44.23, 44.34, 44.25, 110, 275.3; 250/201, 202

[56] References Cited

U.S. PATENT DOCUMENTS 4,752,922 6/1988 MacAnally et al. ............ 369/111 X

*Primary Examiner*—Roy N. Envall, Jr.
*Assistant Examiner*—Hung Dang
*Attorney, Agent, or Firm*—Francis A. Sirr; Earl C. Hancock

[57] ABSTRACT

The carriage optics system for an optical data storage system includes a read/write head that consists of fixed and moving optics. The moving optics includes a carriage actuator that is equipped with a beam relaying telescope lens system that minimizes the defocusing effects of the movement of the carriage actuator.

6 Claims, 3 Drawing Sheets

CARRIAGE OPTICS SYSTEM FOR OPTICAL DATA STORAGE SYSTEM

FIELD OF THE INVENTION

This invention relates to data storage systems and, in particular, to an optical disk data storage system that has fixed optics that are in optical communication with movable optics that comprise the read/write head of the data storage system.

PROBLEM

It is a problem in the field of high speed random access optical data storage systems to produce a read/write head that is simple, inexpensive and yet highly accurate. In the optical data storage system field, a modulated and focused radiation beam generated by a laser is typically used to record information on a recording medium. This recording medium is typically in the form of a rotating optical disk on which a plurality of concentrically arranged data storage tracks are written. The read/write apparatus in such a system includes optical elements for focusing the incident read beam on the surface of the recording medium and some means for tracking this read beam on the surface of the recording medium to insure that the incident read beam follows a selected one of the previously recorded concentrically arranged data storage tracks. In addition, apparatus is provided for detecting the data recorded on the recording medium and this typically consists of optical elements for focusing and detecting the incident read beam as reflected off the surface of the recording medium. This reflected incident read beam is applied to a detector to determine the data that is written on the recording medium on the selected data storage track.

The tracking of the incident read beam over the surface of the recording medium is generally accomplished by the use of widely spaced coarse servo tracks that are imprinted on the disk surface in the form of concentrically arranged cylindrical tracks. In a random access optical data storage system, the gross or coarse translation of the optical elements over the surface of the recording medium from one area of the disk to another is accomplished of the use of the servo tracks. This is accomplished by mounting the optics in a carriage actuator for the coarse translation of the read/write optics over the surface of the recording medium. A difficultly with this arrangement is that high speed random access of data from the recording medium is impractical due to the need to place the highly complex and massive optical elements into the moving carriage actuator. An alternative arrangement is to place all of the optical elements on a fixed plane, using optical beam steering to move the beam across the entire disk surface. A problem with this arrangement is that it results in severe focusing and vignetting problems.

In addition to the above described coarse seek movement over the surface of the recording medium, fine seek movement from data storage track to data storage track is also a necessity. To accomplish the precise tracking of the incident read beam over the disk surface, a pair of tracking spots, arranged one on either side of the incident read beam and arranged in a straight line fashion, are used. The tracking spots are focused on opposite edges of a data storage track where they are reflected along with the incident read beam through the optics of the read/write head to a fine seek detector circuit. The fine seek detector circuit compares the reflected tracking spot signal strength to control the tracking of the incident read beam. The coarse seek servo tracking and the fine seek incident read beam tracking must cooperate in locating the selected data storage track and in maintaining proper tracking of the incident read beam on this selected data storage track once the proper track is located.

The individual elements that typically are used to accomplish the tracking and focusing of the incident read beam on the surface of the recording medium include an astigmatic focusing system. This system utilizes a cylindrical lens to astigmatize the incident read beam that is reflected from the surface of the recording medium. The reflected astigmatized beam provides a spot that has two focal lines. This spot is detected by a quad detector circuit which generates a focus control signal in response to the reflected astigmatized beam. In addition, the read/write head includes an objective lens that provides a sharply focused incident read beam that is applied to the surface of the recording medium to read the data that is written on the selected data storage track. In order for the objective lens to properly function, the incident read beam must be focused precisely upon the image plane of that objective lens. With a moving carriage actuator, the image plane of the objective lens is constantly shifting which results in a constantly out of focus incident read beam on the surface of the recording medium. A focus actuator is generally used to adjust the position of the objective lens to accommodate some shift in the focal plane. However, when the carriage actuator translates large distances over the surface of the recording medium in a high speed fashion, the large corrections necessary are difficult to implement with precision.

Therefore, existing apparatus for read/write heads in optical data storage systems can not both rapidly and randomly access high density digital data from a rotating recording medium.

SOLUTION

The above described problems are solved and a technical advance achieved in the field by the carriage optics system for an optical data storage system that has a read/write head consisting of fixed and moving optics, where the moving optics include a carriage actuator that is equipped with a beam relaying telescope lens system that minimizes the defocusing effects of the movement of the carriage actuator. The optical disk system on which this apparatus is located includes three separate optical systems: data writing, data reading and coarse seek apparatus. All of these three separate optical systems share the carriage optics apparatus of the present invention.

Positioning of the read/write head in an optical disk system is accomplished by imprinting a plurality of coarse seek servo tracks on the surface of the optical data recording medium. The plurality of coarse seek servo tracks consists of concentric, equally spaced apart rings written on the surface of the optical data recording medium. The coarse seek optical apparatus transmit a coarse seek optical beam through the carriage optics to the surface of the optical data recording medium and the carriage optics returns the reflected coarse seek optical beam from the surface of the optical data recording medium to a coarse seek servo detector. The signal received by the coarse seek servo detector drives a coarse seek servo motor which moves the carriage actuator and its associated optics over the surface of the optical data recording medium to the preselected band that is to be accessed. A band is defined as the area between adjacent coarse seek servo tracks where the user data is written.

The fine tracking and focusing is accomplished in this system by use of the read beam that is transmitted through the carriage optics system of the present invention. The read beam also provides the means for reading the data that is recorded in the band area on the surface of the optical data recording medium. In operation, the coarse seek servo system locates the band that contains the requested data and the read beam as transmitted to the surface of the optical data recording medium, is used both to read the data from this medium and to provide focus and tracking information to read beam detectors. The detectors generate servo signals to tracking and focus servo motors to provide fine tracking and focus adjustments to the optical system.

The write data optical system consists of a write beam that is transmitted through the carriage optics to the surface of the optical data storage medium for writing user data in a designated band. The write beam is modulated in response to the data that is to be recorded. A servo system optically connects the read and write beams together such that when new data is to be written on the surface of the optical data recording medium, the focus and tracking information is obtained from the read beam as focused on the previously written track on the optical data storage medium and is used to guide the write beam as it writes the present track on the surface of the optical data recording medium.

In order to provide rapid random access to the data stored on the optical data storage medium, the bulk of the optical elements including the read, write and coarse seek light beam sources as well as their corresponding read, focus, tracking and coarse seek detectors are contained in a fixed portion of the apparatus. Only those elements necessary to directly transfer and focus the above mentioned three light beams onto the surface of the optical data recording medium are located in the carriage optics moveable portion of the apparatus. The carriage actuator includes a beam relaying telescope lens system which significantly minimizes the effects of the radial translation of the carriage actuator over the disk surface with respect to the fixed elements in this optical system. Therefore, high speed and random access to the data written on the surface of the optical data storage medium is provided by the use of simple apparatus including a minimum number of elements in the carriage actuator portion of this apparatus.

DETAILED DESCRIPTION

Figure 1:
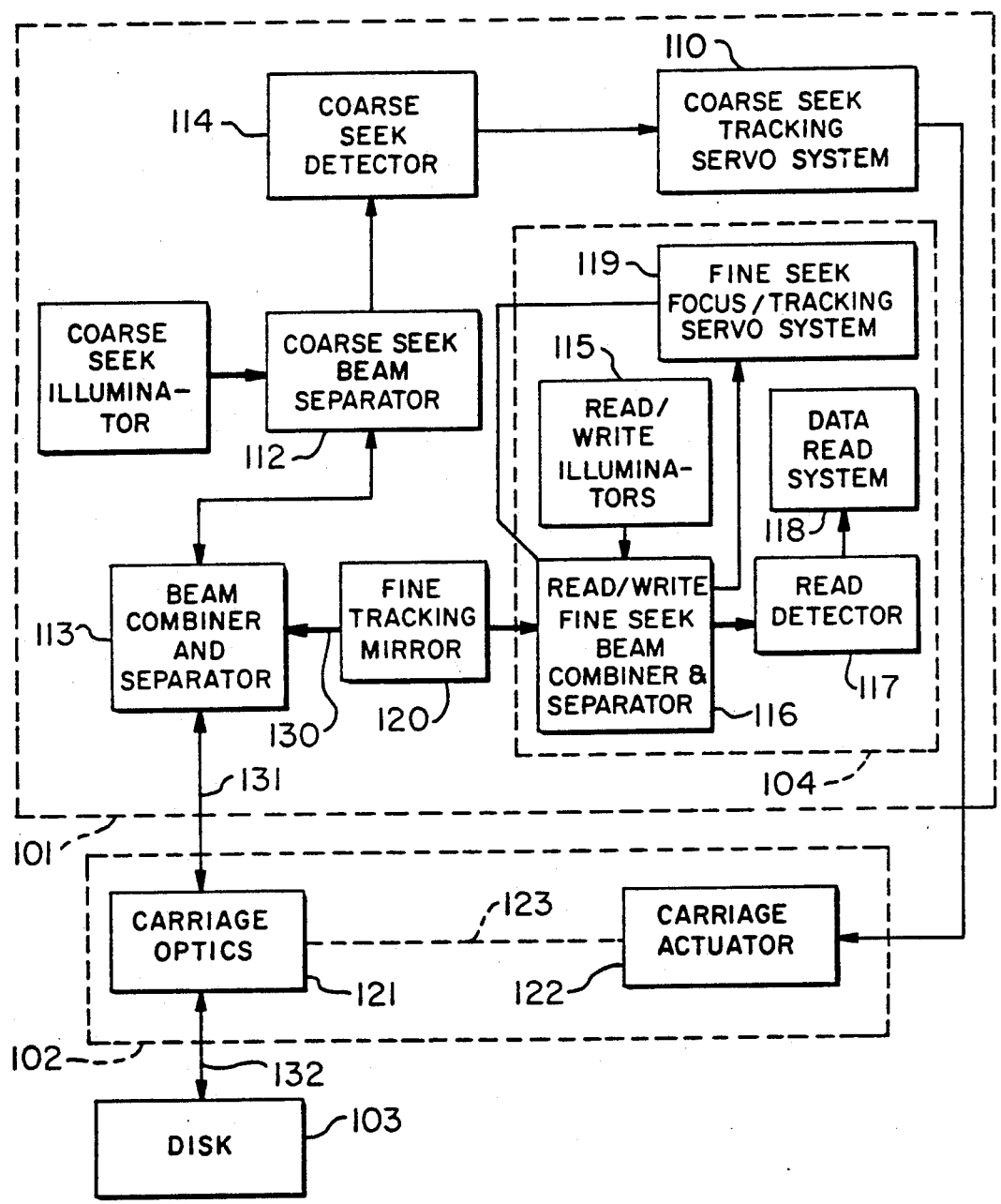
FIG. 1 is a schematic drawing that illustrates in block diagram form the functional elements of the optical disk storage system.

The carriage optics system for an optical data storage system includes a read/write head that consists of fixed and moving optics. The moving optics includes a carriage actuator that is equipped with a beam relaying telescope lens system that minimizes the defocusing effects of the movement of the carriage actuator. The optical disk system on which this apparatus is located includes three separate optical systems: data writing, data reading and coarse seek apparatus. All of these three separate optical systems share the carriage optics apparatus of the present invention.

Positioning of the read/write head in an optical disk system is accomplished by imprinting a plurality of coarse seek servo tracks on the surface of the optical data recording medium. The plurality of coarse seek servo tracks consists of concentric equally spaced apart rings written on the surface of the optical data recording medium. The coarse seek optical apparatus transmit a coarse seek optical beam through the carriage optics to the surface of the optical data recording medium and the carriage optics returns the reflected coarse seek optical beam from the surface of the optical data recording medium to a coarse seek servo detector. The signal received by the coarse seek servo detector drives a coarse seek servo motor which moves the carriage actuator and its associated optics over the surface of the optical data recording medium to the preselected band that is to be accessed. A band is defined as the area between adjacent coarse seek servo tracks where the user data is written.

The fine tracking and focusing is accomplished in this system by use of the read beam that is transmitted through the carriage optics system of the present invention. The read beam also provides the means for reading the data that is recorded in the band area on the surface of the optical data recording medium. In operation, the coarse seek servo system locates the band that contains the requested data and the read beam, as transmitted to the surface optical data recording medium, is used both to read the data from this medium and to provide focus and tracking information to read beam detectors. The detectors generate servo signals to tracking and focus servo motors to provide fine tracking and focus adjustments to the optical system.

The write data optical system consists of a write beam that is transmitted through the carriage optics to the surface of the optical data storage media for writing user data in a designated band. The write beam is modulated in response to the data that is to be recorded. A servo system optically connects the read and write beams together such that when new data is to be written on the surface of the optical data recording medium, the focus and tracking information is obtained from the read beam as focused on the previously written track on the optical data storage media and is used to guide the write beam as it writes the present track on the surface of the optical data recording medium.

In order to provide rapid random access to the data stored on the optical data storage medium, the bulk of the optical elements including the read, write and coarse seek light beam sources as well as their corresponding read, focus, tracking and coarse seek detectors are contained in a fixed portion of the apparatus. Only those elements necessary to directly transfer and focus the above mentioned three light beams onto the surface of the optical data recording medium are located in the carriage optics moveable portion of the apparatus. The carriage actuator includes a beam relaying telescope lens system which significantly minimizes the effects of the radial translation of the carriage actuator over the disk surface with respect to the fixed elements in this optical system. Therefore, high speed and random optical data storage medium is provided by the use of simple apparatus including a minimum number of elements in the carriage actuator portion of this apparatus.

SYSTEM ARCHITECTURE

Figure 2:
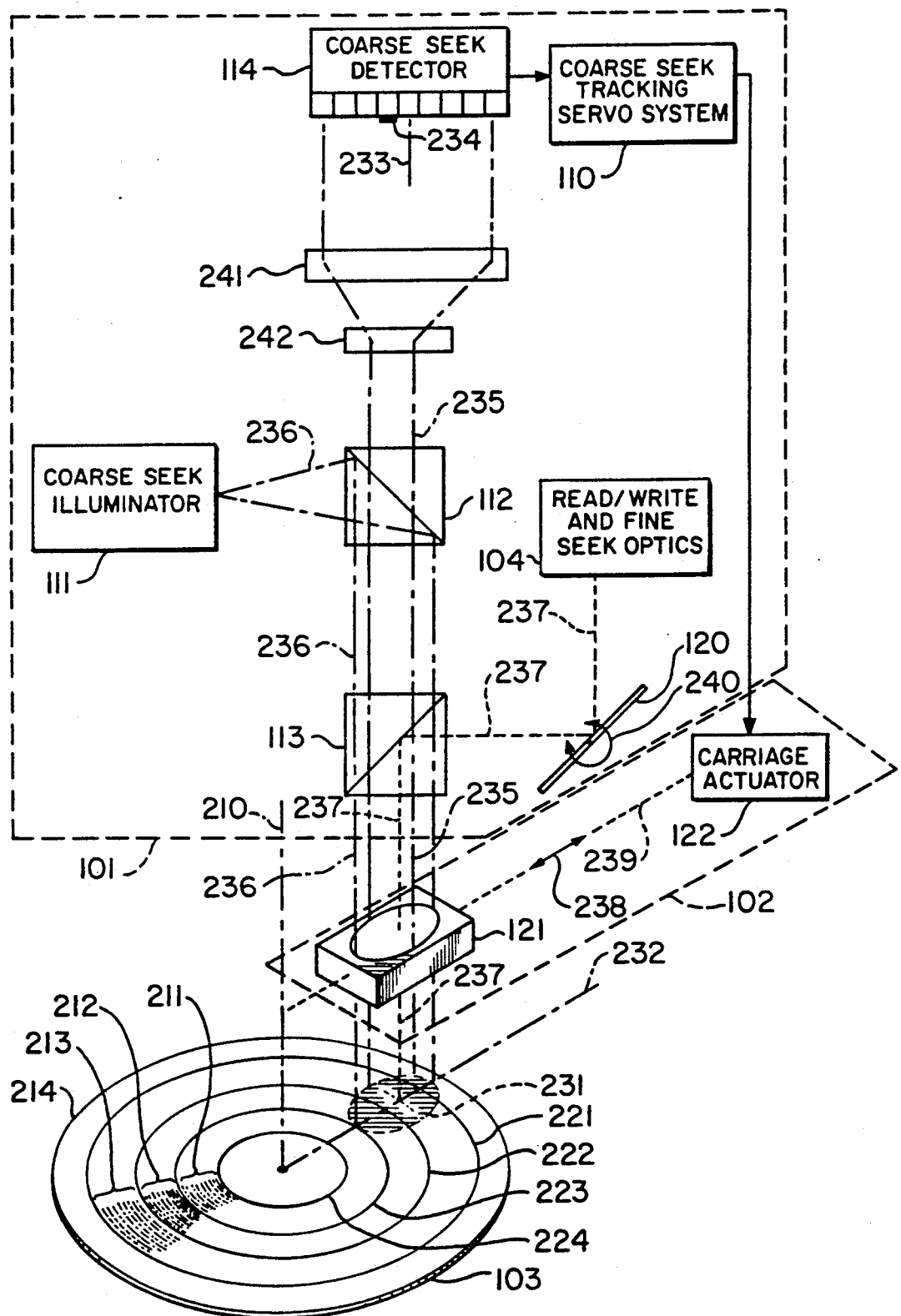
FIG. 2 is a perspective drawing of the optical elements that comprise the optical data storage system.

FIGS. 1 and 2 illustrate in block diagram form and perspective view, respectively, the optical elements that comprise the read, write and coarse seek apparatus of the optical disk system. As can be seen from these figures, a read, write and coarse seek apparatus share a number of common optical elements as is described below. The apparatus illustrated in FIGS. 1 and 2 can be divided into fixed optical elements 101, moveable optical elements 102, and the optical data storage medium 103. Fixed optical elements 101 include all of the beam forming, beam combining coarse and fine tracking optical elements while moveable optical elements 102 include beam transferring and beam focusing optical elements.

In order to better under the operation of the present invention, a description of the read, write and coarse seek optical apparatus is provided as background information. The system illustrated in FIGS. 1 and 2 allows reading and writing of data from and to the surface of the optical data storage medium that is in the form of a disk 103 that has a rotational axis 210 and a plurality of concentrically arranged data bands 211-213. Each of the data bands 211-213 includes a plurality of data tracks that are concentrically spaced about a rotational axis 210. The surface of disk 103 has prerecorded thereon during the manufacturing process a plurality of optically readable servo tracks 221-224 that are concentrically and uniformly spaced about rotational axis 210 of disk 103 and positioned between the data bands 211-213.

Disk 103 is rotated about rotational axis 210 by conventional means. An optical read/write head in the form of carriage optics 121 is positioned adjacent to the surface of disk 103. Carriage actuator 122 selectively and controllably moves carriage optics 121 along a radial axis, illustrated by dashed line 232 on FIG. 2, with respect to disk 103 in order to access the data bands 211-213 that are written on the surface of disk 103. The mechanical motion of carriage optics 121 is depicted in FIG. 2 as dotted line 239 with motion being possible in both directions along the radial axis 232 as indicated by the double headed arrow 238 on FIG. 2.

Read/write and fine seek optics 104 projects read and write light beams 237 to the surface of disk 103 to access the data tracks 211-213 written on the surface of disk 103. The read and write light beams 237 are transmitted by read/write and fine seek optics 104 to fine tracking mirror 120 which focuses these light beams into beam combiner and separator 113. The read and write light beams 237 are reflected by beam combiner and separator 113 to carriage optics 121 which focuses the read and write beams 237 on the surface of disk 103 to read data written thereon. The read and write beams 237 are reflected from the accessed recorded data track 213 to carriage optics 121 and thence through beam combiner and separator 113 and fine tracking mirror 120 to read/-write and fine seek optics 104. The reflected read and write beams are separated by read/write and fine seek beam combiner and separator 116 and applied to read detector 117 and fine seek focus/tracking servo system 119. Read detector 117 converts the received light beam into an equivalent electrical signal. This electrical signal is in turn applied to data read system 118 where the data content of track 213 of disk 103 is decoded. The optical signal that is applied to fine seek focus/tracking servo system 119 is used to orient carriage optics 121 in position over the designated data track in band 213.

COARSE SEEK SYSTEM

The servo system that is used to position carriage optics 121 includes a coarse seek illuminator 111 which projects a coarse seek beam of light 236 in FIG. 2 through a coarse seek beam separator 112, beam combiner and separator 113 and carriage optics 121 onto a strip or line portion 213 of the surface of disk 103. This coarse seek light beam 236 illuminates a portion of the surface of disk 103 that includes at least the distance between two coarse servo tracks 221, 222 and thereby always illuminates at least one coarse servo track. As illustrated in FIG. 2, the coarse seek beam 236 illuminates the surface of the disk between and on either side of coarse servo tracks 221, 222 thereby projecting an image of both of these servo tracks 221, 222 onto coarse seek detector 114. This is accomplished by carriage optics 121 receiving the reflected coarse seek light beam 235 and transmitting it via coarse seek beam separator 112 to coarse seek detector 114. The reflected coarse seek light beam 235 is focused through a coarse seek optics 241, 242 to a detector surface 234 of coarse seek detector 114. The coarse seek detector surface 234 has a radiant energy collection surface upon which the reflective coarse seek light beam 235 is projected by the coarse seek optics 241, 242. The focused reflected light beam 235 has an energy center of mass associated therewith which represents that point at which a single ray of radiation having an intensity equivalent to all of the radiation falling upon the surface 234 would actually fall on surface 234. Coarse seek detector 114 generates output signals that are transmitted to coarse seek tracking servo system 110 indicative of the radial position error of carriage optics 121. Coarse seek tracking servo system 110 transmits control signals to carriage actuator 122 to reposition carriage optics 121 into radial proximity of the selected servo track 221 on the surface of disk 103 so that read/write and fine seek optics 104 can accurately position the read and write beams onto a selected data track in band 213.

FINE SEEK SYSTEM

As indicated previously, the light beam reflected from a single data track on the surface of disk 103 is passed through carriage optics 121, beam combiner and separator 113, fine tracking mirror 120, read/write and fine seek beam combiner and separator 116 to fine seek focus/tracking servo system 119. This reflected light beam is used by fine seek focus/tracking servo system 119 to control the positioning of fine tracking mirror 120 to move the read and write beams from read/write illuminators 115 in a radial direction 232 on the surface of optical disk 103. The radial movement of the read and write beams is provided by means of fine tracking mirror 120 the position of which is controlled by fine seek focus/tracking servo system 119, thereby providing for fine selective control of the read and write beam radial position. The fine tracking mirror 120 is typically a conventional galvanometer-controlled mirror.

MOVEABLE OPTICS

Figure 3:
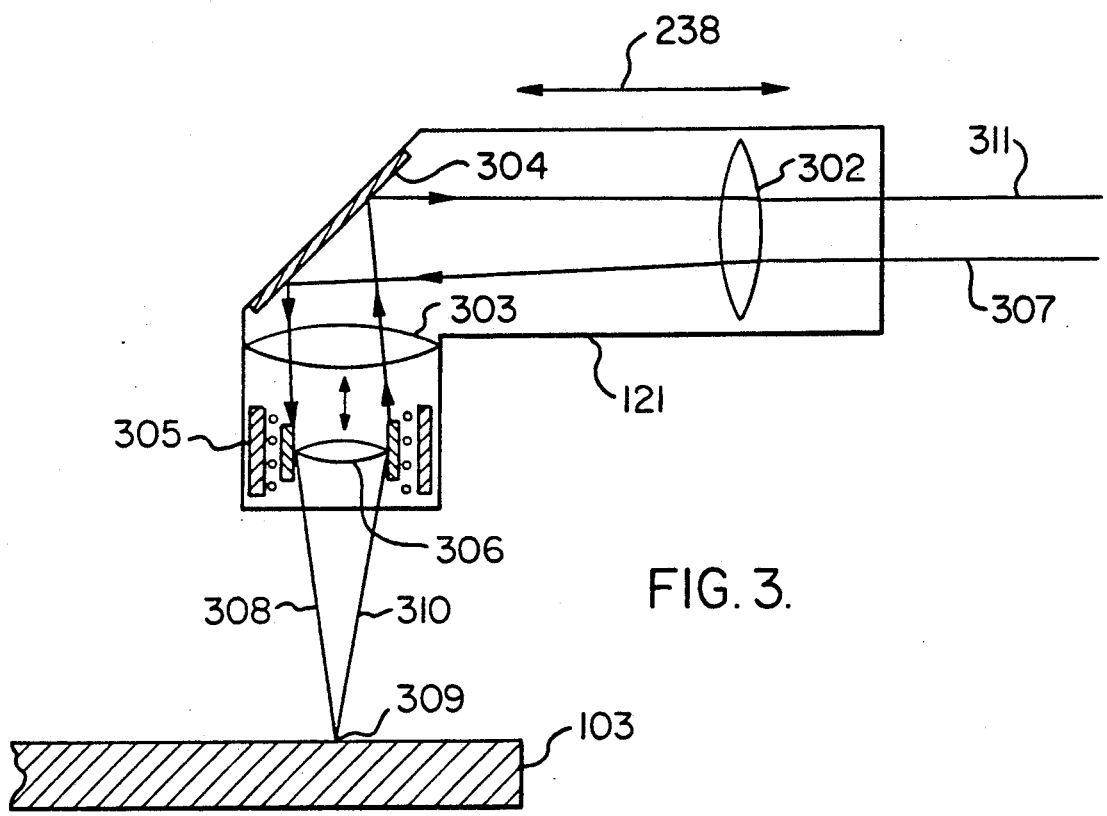
FIG. 3 is a side cut away view of the movable optics of the preferred embodiment of the disclosed invention.

As shown in FIGS. 1 and 2, the moveable optics consists of carriage optics 121 and carriage actuator 122 that are used to provide rapid radial translation of the read and write beams. FIG. 3 illustrates in cross section view the various elements that are included in carriage optics 121. These elements include beam relaying telescope 301 that is comprised of first and second infinite conjugate doublet lens 302, 303, a beam folding planar mirror 304, an objective lens focus actuator 305 and an objective lens 306. The incident coarse seek, read and write light beams all enter carriage actuator 121 and pass through the first infinite conjugate doublet lens 302 and are reflected downward by the planar mirror 304 passing through the second infinite conjugate doublet lens 303 that comprises beam relaying telescope 301. These reflected and focused light beams all enter the entrance pupil of objective lens 306 to be focused on the surface of disk 103.

Figure 4:
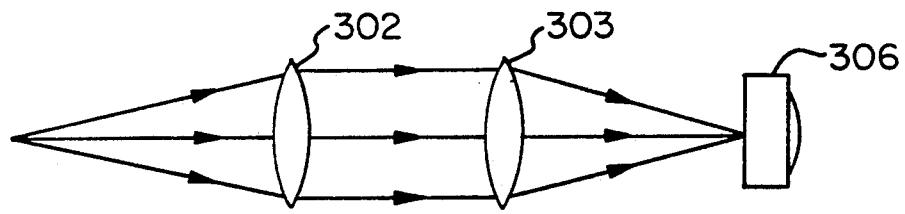
FIGS. 4 and 5 are diagrams that illustrate the operation of the beam relaying telescope to minimize the focus error caused by translation of the carriage actuator over the surface of the optical data storage medium.
Figure 5:
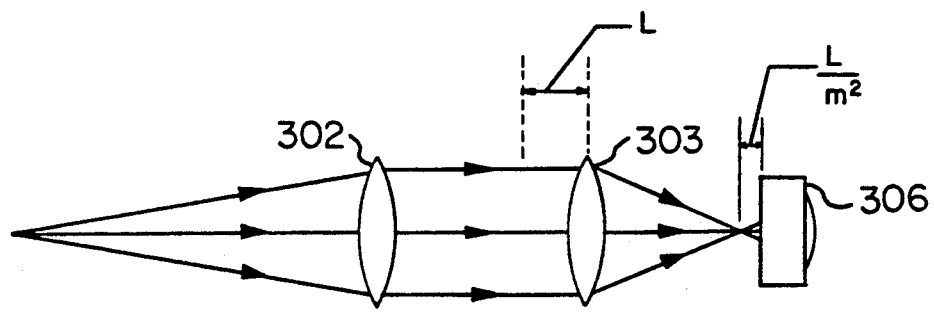

FIG. 4 illustrates how beam relaying telescope 301 advantageously minimizes the defocusing effects of the radial translation of carriage optics 121 over the surface of disk 103. The beam relaying telescope 301 uses the two infinite conjugate doublet lenses 302, 303 to minimize the effect of the image plane shifting during the relocation of carriage optics 121 due to the operation of carriage actuator 122. For a carriage optics radial translation of distance L, the image plane for the objective lens 306 is only shifted a distance of $L/m^2$, where m is the magnification of the beam relaying telescope 301. Thus, the objective lens focus actuator 305, instead of being required to correct for a movement of distance L is only required to correct for a movement of distance $L/m^2$.

The reflected coarse seek 235 and read and write beams 237 all pass back through objective lens 306, and second infinite conjugate doublet lens 303 to be reflected off planar mirror 304 through first infinite conjugate doublet lens 302 to pass out of carriage optics 121 to beam combiner and splitter 113. As discussed above, the reflected coarse seek beam 235 is applied through beam combiner and separator 113, coarse seek beam separator 112 to coarse seek detector 114 while the reflected read and write beams 237 are applied through fine tracking mirror 120 to read/write and fine seek optics 104.

Thus, by use of a beam relaying telescope, the effect of radial translations of carriage optics 121 are significantly reduced, with the reduction being a function of the magnification of the telescope squared. In this fashion, the moveable optics 102 can remain fairly simple and lightweight so that carriage actuator 122 can translate carriage optics 121 in a rapid fashion to rapidly and randomly access all of the data that is stored on the surface of disk 103. Reducing the amount of focusing that must be corrected for by the objective lens focus actuator 305 enables this actuator to quickly focus the read and write beams as well as enabling this apparatus to be simple in design and construction.

While a specific embodiment of the present invention has been disclosed, it is expected that those skilled in the art can and will devise alternate embodiments which fall within the scope of the appended claims.

I claim:

1. In an optical data transmission system having a fixed and moving optics, with an optical beam transmitted from said fixed optics to said moving optics, apparatus in said moving optics for minimizing the focus error due to the movement of said moving optics relative to said fixed optics comprising:
   objective lens means for focusing said transmitted optical beam, received on the focal plane of said objective lens means, on a target surface;
   telescope means responsive to the movement of said moving optics a distance L for reducing the image plane shift caused by said movement to $L/m^2$, where m is the magnification of said telescope means, and
   focus actuator means responsive to the movement of said moving optics for adjusting the position of said objective lens means a distance $L/m^2$ along the line of sight of said objective lens means and in a direction to maintain the focus of said transmitted optical beam on said target surface.

2. The apparatus of claim 1 wherein said telescope means includes:
   first lens means for relaying said transmitted optical beam received from said fixed optics;
   second lens means responsive to said relayed optical beam for focusing said relayed optical beam on the focal plane of said objective lens means.

3. The apparatus of claim 2 wherein said first lens means is an infinite conjugate achromatic doublet lens.

4. The apparatus of claim 3, wherein said second lens means is an infinite conjugate achromatic doublet lens.

5. The apparatus of claim 4 wherein said objective lens means is a compound spherical lens.

6. In an optical data storage system for optically reading/writing data on an optical data storage media, a read/write optics apparatus comprising:
   fixed optics means for generating coextensive read/write optical beams to read/write data on said optical data storage media;
   moving optics means movable over the surface of said optical data storage media for focusing said read/write optical beams on to said optical data storage media to read/write data thereon, including:
   objective lens means for focusing said read/write optical beams, that are received on the focal plane of said objective lens means, on said data storage media;
   telescope means responsive to the movement of said moving optics means a distance L for reducing the image plane shift caused by said movement to $L/m^2$, where m is the magnification of said telescope means, including:
   first lens means for relaying said read/write optical beams received from said fixed optics means;
   second lens means responsive to said relayed optical beams for focusing said relayed optical beams on the focal plane of said objective lens means;
   focus actuator means responsive to the movement of said moving optics means for adjusting the position of said objective lens means $L/m^2$ along the line of sight of said relayed optical beams to maintain the focus of said optical beams on said data storage media.

* * * * *

UNITED STATES PATENT AND TRADEMARK OFFICE
CERTIFICATE OF CORRECTION

PATENT NO. : 5,088,079
DATED : February 11, 1992
INVENTOR(S) : James W. Baer

It is certified that error appears in the above—identified patent and that said Letters Patent is hereby corrected as shown below:

Column 5, line 6, after "random" insert --access to the data written on the surface of the--.

Column 8, line 62, after "means" insert --a distance--.

Signed and Sealed this

Eighteenth Day of May, 1993

Attest:

MICHAEL K. KIRK

Attesting Officer    Acting Commissioner of Patents and Trademarks